Jan. 26, 1971     J. A. TRAPP     3,558,243
PORTABLE FAN
Filed Dec. 2, 1968
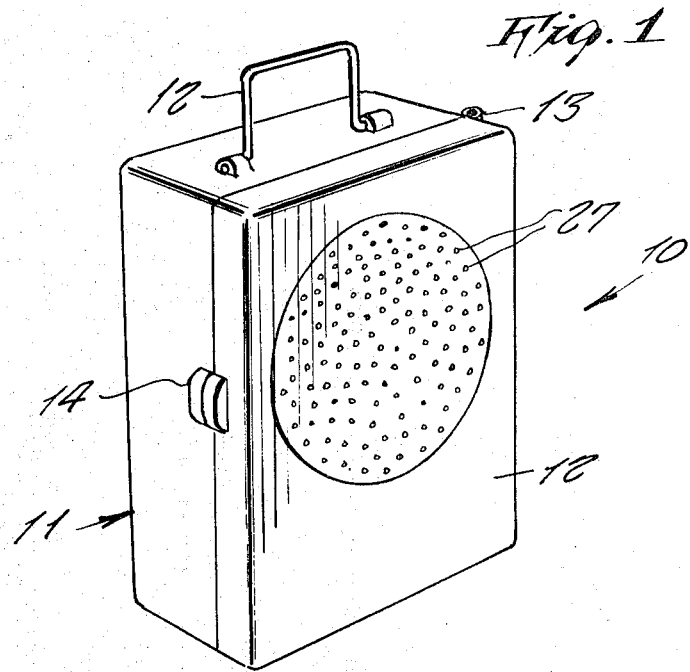
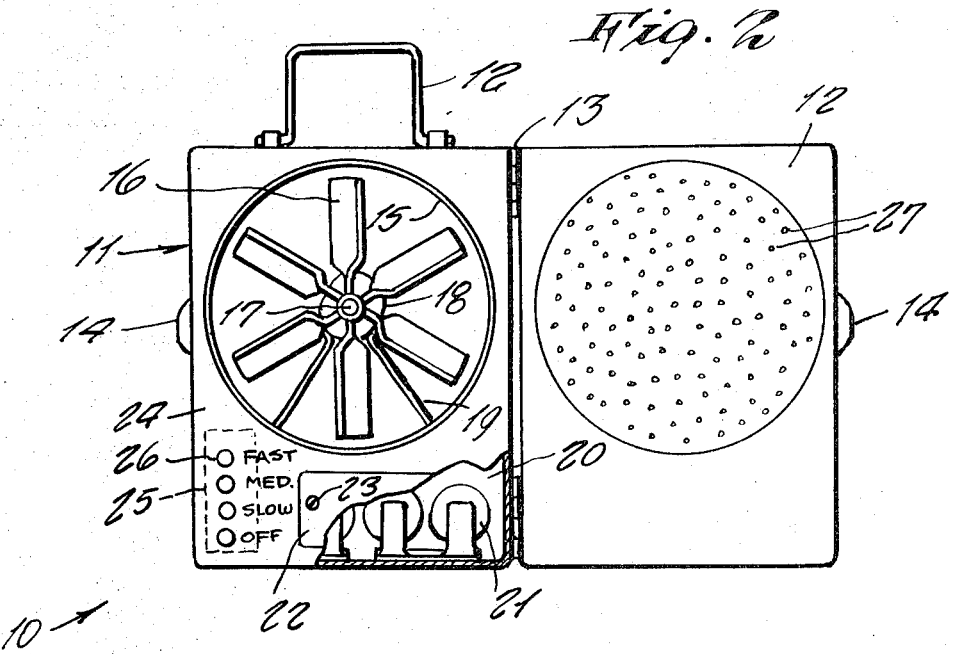
INVENTOR
JOHN A. TRAPP

United States Patent Office 3,558,243
Patented Jan. 26, 1971

3,558,243
PORTABLE FAN
John A. Trapp, 2531 Leslie, Detroit, Mich. 48238
Filed Dec. 2, 1968, Ser. No. 780,391
Int. Cl. F04b *17/00*
U.S. Cl. 417—411     3 Claims

ABSTRACT OF THE DISCLOSURE

A portable fan that is contained within a carrying case so that it may be conveniently transported to places for use, the case including a compartment for dry cell batteries and a manually operable three-speed switch in electric circuit with a fan motor.

---

This invention relates generally to fans.

A principal object of the present invention is to provide a fan which is readily portable so that it can be conveniently transported to places for use such as at baseball games, and other gatherings where air conditioning is not provided.

Another object of the present invention is to provide a portable fan which is contained within a convenient carrying case having a handle and the case containing electrical power for driving the fan motor.

Yet another object of the present invention is to provide a portable fan which is immediately operative by simply opening the case and pushing a switch button to a selected speed, after which the case is closed, the front of the case being provided with louvers or openings through which air is blown by the fan blades.

Other objects of the present invention are to provide a portable fan which is simple in design, expensive to manufacture, rugged in construction, easy to use and efficient in operation.

These and other objects will be readily evident upon a study of the following specification and the accompanying drawing wherein:

FIG. 1 is a perspective view of the present invention shown with the carrying case in a closed position, and FIG. 2 is a front elevation view thereof shown with the case in an open position, shown partly in cross section.

Referring now to the drawing in detail, the reference numeral 10 represents a portable fan, according to the present invention wherein there is a case 11 that is provided with a convenient carrying handle 12 at an upper end thereof, the case having a cover 12 pivotly secured thereto by means of hinges 13 along one side thereof. The opposite side is provided with a latch assembly 14 for maintaining the cover in a closed position respective to the case.

The case 11 is provided with a large central opening 15 extending therethrough and within which a fan blade 16 is rotatable upon a shaft 17 of an electric motor 18 mounted upon a bracket 19 secured to the case 11.

The case 11 includes a central compartment 20 within which there are contained a plurality of dry cell batteries 21 or other electrical source means. A removable cover plate 22 secured by screws 23, is fitted upon a front wall 24 of the case 11 for the purpose of providing access to the batteries so to replace the same after being used up. An electric switch 25 is also fitted within the compartment 20, the switch 25 having a plurality of projecting pushbuttons 26 extending out of the case 11 whereby the push buttons may be selectively manually operated. The electric motor 18, the batteries 21 and the switch 25 are in a series electrical circuit.

The cover 12 is provided with a plurality of small openings 27 or a plurality of louvers therethrough which are located directly in alignment with the fan blade 16 so that air moved by the fan blade will be directed through the openings 27 of the cover.

In operative use, the device can be transported conveniently by means of the handle 12. After arrival where it is intended to be used, a person need only to unlatch the device and open the cover so as to gain access to the push buttons 26, each of which is identified with an appropriate text so that a person may select a speed at which the fan is to operate. After depressing the desired push button, the person then closes the cover again while the motor starts to rotate the fan blade which thus draws air through the opening 15 of the case and blows the air outwardly through the small openings 27 in the cover. A person positioned in front of the cover will thus receive a cooling air.

While various changes may be made in the detailed construction, it is understood that such changes will be within the spirit and scope of the present invention as is defined by the appended claims.

What I now claim is:

1. In a portable fan, the combination of a case and a cover, a fan assembly contained within said case, power means carried by said case for electrically driving said fan assembly, said case having a large central opening extending therethrough, an electric motor centrally positioned within said opening, said motor being supported upon a pair of brackets secured to said case, said motor having a motor shaft, a fan blade mounted upon said motor shaft, said fan blade being rotatable within said opening of said case, said case having a central compartment containing a plurality of replaceable dry cell batteries, said case having a front side and a removable door upon said front side for providing access to said batteries for removal thereof, said compartment containing also an electric switch, said electric switch having a plurality of speed selection push buttons extending outwardly of said front wall of said case, each of said push buttons being identified with an appropriate text indicating the speed for driving said motor.

2. The combination as set forth in claim 1 wherein said batteries, said switch and said motor are connected in series electrical circuit.

3. The combination as set forth in claim 2, wherein said cover is pivotly secured to said case by means of a hinge along one side thereof, a latch assembly being located upon an opposite side for maintaining said cover in a closed position, and said cover having a plurality of openings therethrough, said openings being in alignment with said fan blade so to allow blowing air to pass therethrough.

References Cited

UNITED STATES PATENTS

| | | | |
|---|---|---|---|
| 1,108,053 | 8/1914 | Wiwi et al. | 230—259 |
| 2,582,572 | 1/1952 | Tulk | 230—259 |
| 2,590,952 | 4/1952 | Fukal | 230—259 |
| 2,803,527 | 8/1957 | Lundahl | 230—259 |
| 2,850,228 | 9/1958 | Rowley | 230—117 |
| 3,086,698 | 4/1963 | Goldstein | 230—117 |
| 2,571,374 | 10/1951 | Mayr | 230—117 |
| 3,045,900 | 7/1962 | Zekendrof | 230—249.5 |

FOREIGN PATENTS

| | | | |
|---|---|---|---|
| 1,024,669 | 1/1953 | France | 230—259 |

HENRY F. RUDUAZO, Primary Examiner